(12) United States Patent
Bahrton (10) Patent No.: US 6,419,463 B1
(45) Date of Patent: Jul. 16, 2002

(54) REVERSING VALVE FOR A DIAPHRAGM PUMP

(76) Inventor: Svante Bahrton, Selmedalsringen 18, Hägersten (SE), 129 36

( * ) Notice: Subject to any disclaimer, the term of this patent is extended or adjusted under 35 U.S.C. 154(b) by 0 days.

(21) Appl. No.: 09/530,589

(22) PCT Filed: Nov. 12, 1998

(86) PCT No.: PCT/SE98/02045
§ 371 (c)(1),
(2), (4) Date: May 5, 2000

(87) PCT Pub. No.: WO99/25999
PCT Pub. Date: May 27, 1999

(30) Foreign Application Priority Data

Nov. 13, 1997 (SE) .............................................. 9704160

(51) Int. Cl.$^7$ ............................ F04B 43/06; F04B 9/087; F04B 35/02; G05D 7/00; G05D 11/00
(52) U.S. Cl. ...................... 417/395; 417/386; 417/384; 417/383; 137/106; 137/119.09
(58) Field of Search ................................ 417/395, 394, 417/386, 384, 383; 137/106, 119.02, 119.09

(56) References Cited

U.S. PATENT DOCUMENTS

| | | | | |
|---|---|---|---|---|
| 2,927,606 A | * | 3/1960 | Matchett, Jr. et al. ....... | 137/608 |
| 3,051,188 A | * | 8/1962 | Tilney .......................... | 137/119 |
| 3,709,244 A | * | 1/1973 | Zadow et al. ................ | 137/106 |
| 3,722,525 A | * | 3/1973 | Epple ........................... | 137/106 |
| 3,738,227 A | * | 6/1973 | Bitzer et al. .................. | 91/167 |
| 3,791,768 A | * | 2/1974 | Wanner ........................ | 417/393 |
| 4,344,212 A | * | 8/1982 | Bolssens et al. ............. | 29/33 F |
| 4,432,215 A | | 2/1984 | Yoshida ....................... | 62/324.6 |
| 4,817,666 A | * | 4/1989 | Sanville .................. | 137/596.17 |

FOREIGN PATENT DOCUMENTS

| | | | | |
|---|---|---|---|---|
| DE | 39 09 800 | | 9/1990 | ........... F04B/43/06 |
| EP | 0 132 913 | | 2/1985 | ........... F04B/43/06 |
| EP | 0 492 242 | | 7/1992 | ........... F16K/31/06 |
| SE | 503 552 | | 7/1996 | ........... F04B/43/06 |
| WO | 96-34202 | * | 10/1996 | ........... F04B/43/06 |

* cited by examiner

Primary Examiner—Charles G. Freay
Assistant Examiner—Timothy P. Solak
(74) Attorney, Agent, or Firm—Jacobson Holman, PLLC

(57) ABSTRACT

A valve housing (10) includes an inlet port (11) and two outlet ports (12, 13) for fluid passing through the housing. A valve element (15) accommodated in the valve housing is moveable freely between two end positions and has two surfaces (16) each adapted to close a respective outlet port in one and the other of the two end positions of the valve element. The valve element further includes members (20, 22; 21, 22; 21, 26, 47; 26, 48; 26, 50; 26, 51–54) for resetting between the positions. A double-action pump includes two spaces or rooms that have valve-controlled inlets and outlets (39, 40; 29, 30) for drive fluid and pump-transported working fluid respectively. The spaces are divided into an operating chamber (28) and a working chamber (27) by partition walls (26, 36, 37) which are pistons or diaphragms (26) and reciprocatingly move between end positions. The partition walls are interconnected by a movement transmission member (38) and working fluid is pressed out of one of the working chambers and drawn into the other. The operating chamber inlets (39) are each connected to a respective outlet port (12 or 13). The pump includes resetting member which at the end positions causes the valve element (15) to be moved over only a part of its movement path to its opposite end position.

25 Claims, 5 Drawing Sheets

REVERSING VALVE FOR A DIAPHRAGM PUMP

CROSS-REFERENCE TO RELATED APPLICATION

This application is related to REVERSING VALVE FOR A DIAPHRAGM PUMP to Svante Bahrton, Ser. No. 09/530,590 filed May 5, 2000.

BACKGROUND OF THE INVENTION

1. Field of the Invention

The present invention relates to a valve arrangement of the kind that includes a valve housing which has an inlet port and two outlet ports for fluid flowing through the housing. The valve housing accommodates a valve element that can move freely between two end positions and that has two surfaces which each co-act with a respective outlet port and which function to close an associated outlet port in respective first and second end positions of the valve elements. The valve arrangement further including means for switching the valve element between the positions.

2. Related Art

Valve arrangements of this kind are know, for instance, from U.S. Pat. No. 4,432,215.

SUMMARY OF THE INVENTION

The object of the present invention is to provide a novel and advantageous method of integrating a valve arrangement of the aforesaid kind with a double-acting pump, wherewith there is obtained an arrangement that can be given only a few moveable parts, that will operate quickly and can be positively reset and that lacks any tendency of being set to a neutral position in which both of the outlet ports communicate simultaneously and permanently with the inlet port.

It is proposed to this end in accordance with the invention that the valve arrangement of the aforedescribed kind shall be coordinated with a double-acting pump of the kind that includes two spaces having valve-controlled inlets and outlets for a drive fluid and a pump-transported working fluid respectively, wherein each of said spaces is divided into an operating chamber and a working chamber by means of a respective partition wall in the form of a piston or diaphragm that can move reciprocatingly between end positions, and wherein the partition walls are mutually connected by movement transmission means and perform alternate working strokes under the influence of said drive fluid, during which working strokes working fluid is pressed out from one of said working chambers and drawn into the other of said working chambers, and vice versa, and wherein each of the operating chamber inlets is coupled to a respective outlet port of the valve arrangement and the pump includes resetting means which in the end positions of said partition walls causes the valve element located in one end position to move over only a part of its movement path to the is opposite position.

Further characteristic features of the invention will be apparent from the following objects wherein it is an object of the invention to provide the valve arrangement wherein a resetting means exerts temporarily on the valve element a mechanical or electromagnetic force that exceeds the force exerted by the fluid pressure on the valve element in the opposite direction. Each operating chamber is connected to an associated outlet port of the valve arrangement via a conduit which is adapted to be closed by the associated partition wall when the wall is located in one of its end positions, and in that a fluid bleed passageway extends between the outlet ports and the inlet port common to the outlet ports.

Another object of the invention is that each of the bleed passageways is comprised of a bore or channel that extends through the material of the valve housing or through associated valve element.

A still further object of the invention is that that partition walls include bellow-like structures which are open to the conduits and which function to generate an over pressure in an associated conduit when closing the conduit operating chambers are located close together on both sides of the valve arrangement, and in that the partition walls are provided with pins which each extend into a respective outlet port and, when the partition walls are in their inner end positions, act on an associated valve element surface to initiate resetting the valve element.

It is an object of the invention that the valve element is mounted on one end of a freely pivotal arm and has the form of a valve plate or disk which includes mutually opposite surfaces for alternate co-action with a respective outlet port.

A further object of the invention is that the valve element is connected mechanically to and adapted to drive a further valve element between two positions in which it connects either one or the other of two fluid inlet ports to a fluid outlet port which is common to the two inlet ports.

A still further object of the invention is that the pivotal arm carries on a second end a further valve plate or disc that has mutually opposite valve-element surfaces for co-action with a respective valve port in a further valve space.

Another object of the invention is that the operating chamber outlets are connected to the fluid inlets of the further valve element.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

From the following description of a number of chosen, exemplifying embodiments of the novel valve arrangement are illustrated in the accompanying drawings.

DESCRIPTION OF THE INVENTION

Components that find correspondence or general correspondence in the different Figures of the drawings have been identified with the same reference signs.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
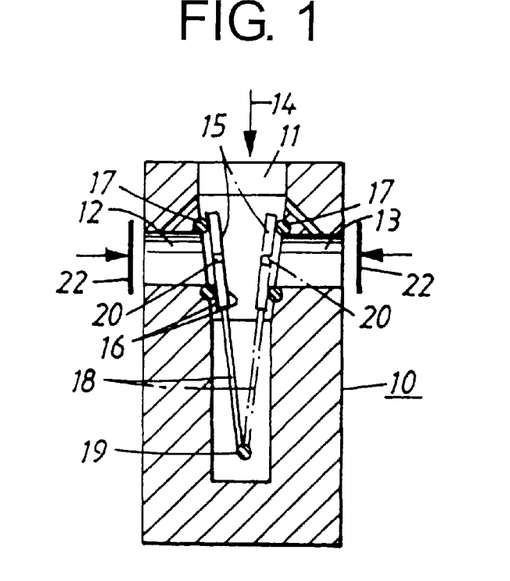
FIG. 1 is a highly schematic, sectional view of a first embodiment of an inventive valve arrangement.

The valve arrangement illustrated in FIG. 1 comprises a valve housing 10 which includes an inlet port 11 and two outlet ports 12, 13 for fluid, either gaseous or liquid, flowing through the valve housing. The fluid is delivered at an overpressure from a source (not shown), as indicated by arrow 14. The valve housing 10 accommodates a movable valve element 15 which has mutually opposite surfaces 16 for closing an associated outlet port 12 or 13 in a respective one or the other of two end positions of the valve element 15. The orifices of respective outlet ports are surrounded by sealing rings 17, to facilitate sealed closure of the valve. In the FIG. 1 embodiment the valve element 15 is comprised of a valve plate or valve disc, the mutually opposite sides of which form closing surfaces 16 and which is mounted on one end of a movable arm 18. The arm 18 is mounted in the valve housing 10 at 19 for pivotal movement between said end positions, wherewith the surfaces 16 of said valve element close one or the other of said outlet ports 12, 13. However, it lies within the scope of the invention to provide the valve-element surfaces on a valve element which has a different form than the illustrated valve element, for instance a substantially cylindrical or a substantially spherical form. In the illustrated case, the fluid entering through the inlet port 11 passes through the valve housing 10 and out through the open outlet port 13. It is presupposed that the closed outlet port 12 is not placed under pressure and consequently the valve element 15 will be held pressed against the port 12 by the force exerted by the inflowing fluid.

Figure 2:
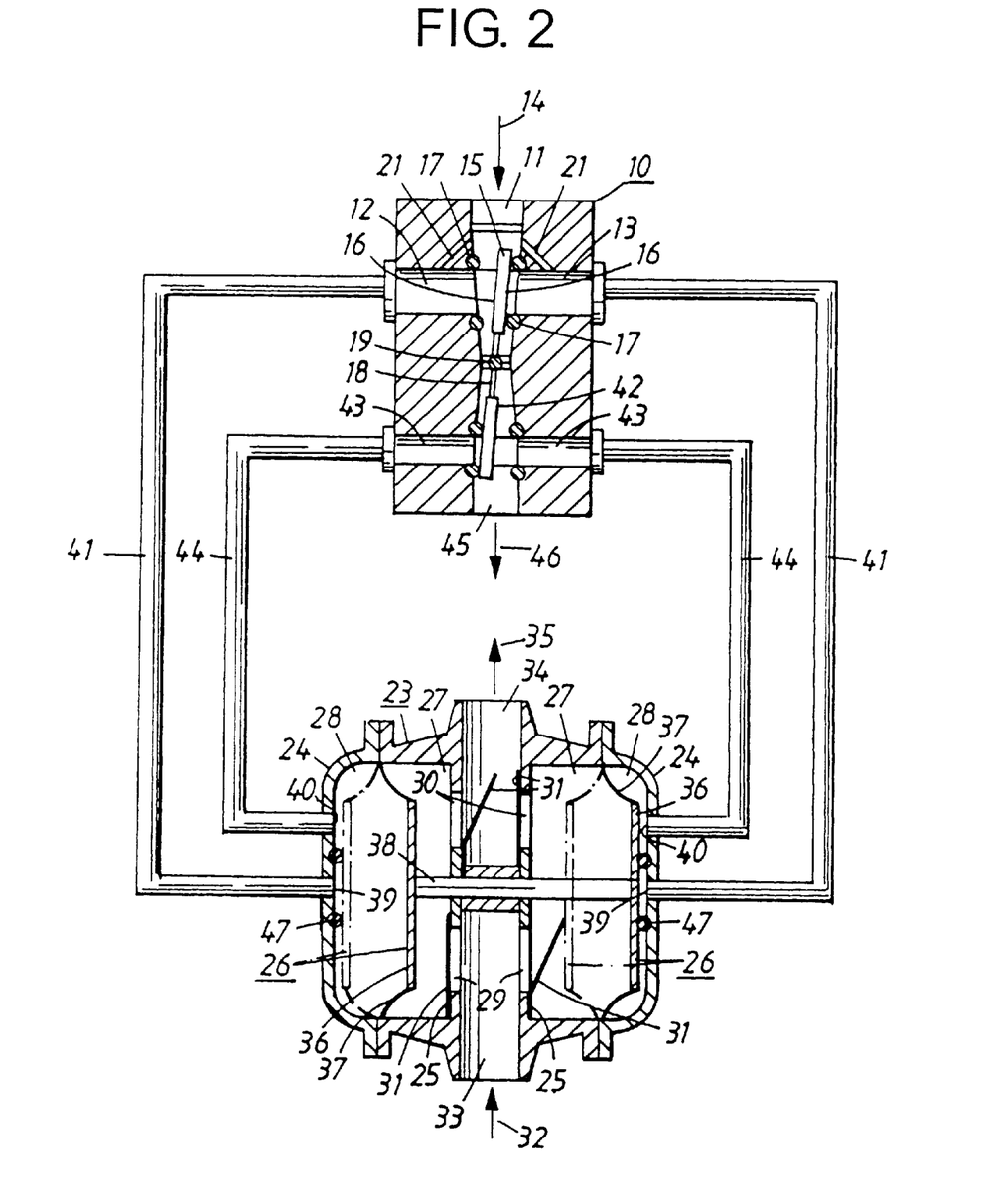
FIG. 2 is a sectional view of a second embodiment of an inventive valve arrangement combined with a double-acting pump.
Figure 7:
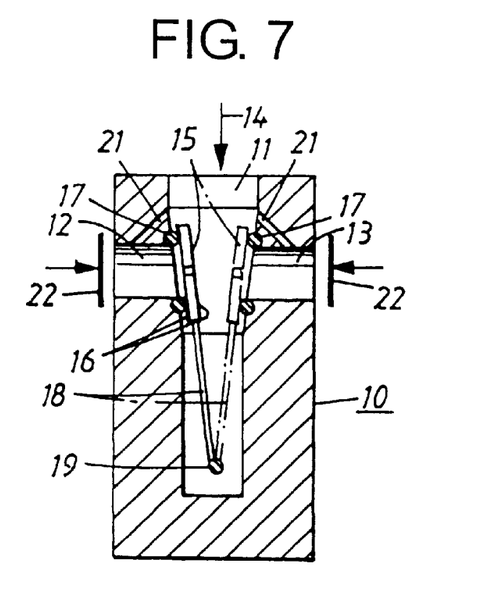
FIG. 7 is a sectional view similar to FIG. 1, which show two bleed passageways.

FIGS. 1 and 7 illustrate the principle for resetting the valve arrangement, where the valve element 15 includes a through-penetrating bleed passage has or opening 20 of such small cross-sectional area that the flow through the bleed passageway or position in which it seals the outlet port 13, so that fluid will now flow through the port 12 immediately the left closure means 22 has returned to the position in which the port 12 is open. bleed opining 20 will be essentially negligible in comparison with the total flow through the valve housing 10. The bleed passageway or bleed opening 20 can be replaced with, e.g., two bleed passageways shown at 21 in FIG. 7 that extend between the inlet port 11 and a respective one of the outlet ports 12, 13. As shown schematically at 22, the valve arrangement also includes closure means for resetting the valve arrangement. The closure means are located downstream of the locations at which the bleed passageways 21 open into respective outlet ports 12, 13 and are intended to temporarily stop all flow of fluid through an associated outlet port. The closure means 22 and the bleed passageways 21 or bleed opening 20 thus form a valve arrangement resetting means. The valve is reset from the state or mode in which fluid passes in through the port 11 and out through the port 13 by movement of the closure means 22 shown on the left in FIGS. 1 and 7 to a state in which it closes the port 12, in the arrow direction. As a result of the presence of the bleed opening or bleed passageways 20, 21, there is built-up in the port 12 a static fluid pressure which generates on the surface of the valve element 15 lying proximal to the port 12 a force which exceeds the pressure exerted by the fluid flowing through the valve housing 10 on the,opposite surface of the valve element. As a result of the differential pressure caused by the fluid flow, the valve element 15 is swung rapidly away from its position in which it seals the port 12 and moves clockwise to its FIG. 2 shows an inventive valve arrangement connected for controlling the operation of a double-acting diaphragm pump. The pump includes a generally cylindrical pump housing 23 which includes two spaces that are delimited by the end walls 24 of the housing and internal walls 25. Each of these spaces is, in turn, divided into a working chamber 27 and an operating chamber 28 by means of a respective diaphragm unit 26, said working chambers 27 being located close to one another and said operating chambers being located outwardly of their associated diaphragm unit 26. Each of the working chambers 27 has valve-controlled inlets and outlets 29, 30 for working fluid transported by the pump, preferably a liquid working fluid. In the illustrated embodiment, the inlets and outlets 29, 30 have the form of openings in the inner chamber walls 25 and check valves 31 in the form of flap valves co-acting with said openings. The working fluid arrives in space 33 in the pump located between the walls 25, in the direction indicated by arrow 32, and leaves the pump through a diametrically opposite space 34 which is also located between the walls 25, and exits said space 34 in the direction of arrow 35.

The diaphragm units 26 include a round, relatively rigid central part 36, and a peripheral part 37 which is comprised of a relatively pliable material and which is connected to the pump housing 23 at its radially outer edge. The diaphragm units 26 are g connected to one another by means of a rod 38 which transfers the movement of one diaphragm unit to the other, and vice versa. For instance, when the diaphragm unit 26 on the left in FIG. 1 moves to the right in response to pressurized operating fluid or drive fluid, e.g. compressed air, in the left operating chamber 28, the rod 38 will press the right diaphragm unit 26 to the right as seen in the FIG. 1.

The operating chambers 28 are provided at 39 and 40 with openings that serve as drive-fluid inlets and outlets respectively, wherewith the inlets 39 are connected via conduits 41 and a valve arrangement having the function described with reference to FIG. 1 to a pressurised fluid source, e.g. to a compressed air network. In addition to the valve element 15 mounted at 19 on the arm 18, the valve arrangement includes a further valve element 42 in the form of a valve plate or valve disk mounted on the other end of the arm 18, said arm 18 being pivotally mounted between its ends in the case of the illustrated embodiment. The valve element 42 is accommodated in the valve housing 10 in a space or valve room that is separated from the inlet and outlet ports 11–13 in a gas-tight and liquid-tight manner and the mutually opposite sides of which valve element close a respective one or the other of two inlet ports provided in the valve housing 10 for return fluid from the operating chambers 28. The latter are connected to the ports 43 via the outlets 40 and conduits 44. The area of the ports 43 is smaller than the area of the ports 12, 13 and said ports 43, in turn, communicate with an outlet port 45 for return fluid that departs from the valve housing 10 in the manner indicated by the arrow 46, depending on the position of the valve element 42. The valve element 42 is reset by means of the valve element 15 and the arm 18 in a manner such as to establish communication between the operating chamber 28 and the outlet port 45 to the right in FIG. 2, provided that there is communication between the operating chamber 28 on the left of FIG. 1 and the operating-fluid inlet port 11 of the valve arrangement, whereas communication between the operating chamber 28 on the left in FIG. 2 and the outlet port 45 will be established provided that the operating chamber 28 on the right of FIG. 2 communicates with the inlet port 11 of the valve arrangement.

Disposed around the operating fluid inlets 40 are seals 47 with which the central parts 36 of the diaphragm units are brought into sealing contact when said diaphragm units 26 reach their outer positions, as illustrated on the right in FIG. 2.

The valve arrangement illustrated in FIG. 2 operates in the following manner: The pressurised drive fluid or operating fluid passes to the left operating chamber 28, through the inlet port 11, the outlet port 12 and the conduit 41 connected thereto. The outlet port 43 on the left in FIG. 2 is held closed by means of the force exerted by the incoming drive fluid on the valve element 15. The left diaphragm unit 26 is pressed to the right and therewith also presses the right diaphragm unit 26 to the right in FIG. 1, through the medium of the rod 38. Working fluid is therewith pressed out from the left working chamber 27, through the open outlet 30, and is sucked into the right working chamber 27 through the open inlet 29, while drive fluid departs through the outlet 40, the conduit 44 and the port 45 of the right operating chamber 28. When the central part 36 of the right diaphragm unit 26 has reached its end position and seals against the sealing ring 47 around the right inlet conduit 41, there is built-up by the drive fluid entering the port 13 through its associated bleed passageway 21 a static overpressure which automatically resets the valve element 15 of the valve arrangement in the aforedescribed way. The flow through the pump and valve arrangement will therewith be reversed, i.e. drive fluid will be pressed through the port 13 and into the operating chamber 28 on the right of FIG. 2 and will leave through the left operating chamber, whereas working fluid will be pressed out from the right working chamber 27 and sucked into the left working chamber until the left diaphragm unit 26 reaches its outer end position and therewith automatically resets the valve element 15.

Figure 3:
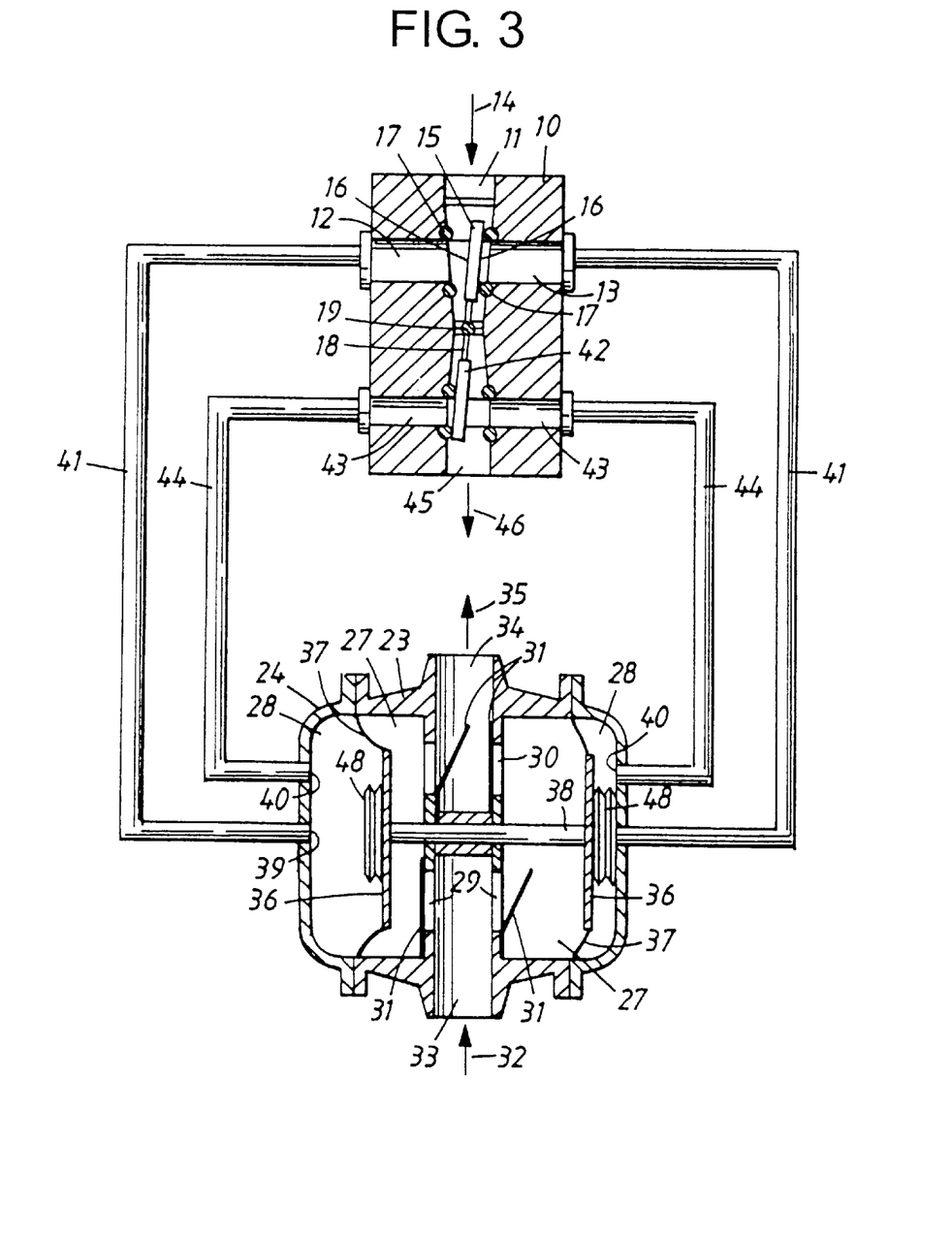
FIG. 3 is a sectional view similar to FIG. 2 but showing a modified resetting means.

The arrangement illustrated in FIG. 3 is similar to the arrangement illustrated in FIG. 2 and will be described solely with reference to those respects in which it differs from the FIG. 2 embodiment. The difference resides in the ability to avoid the use of bleed passageways, such as the passageways 20 or 21, so that all drive fluid entering through the inlet port 11 can be used for useful work. In order to generate a force that will balance out the force exerted by the flowing working fluid on the valve element 15 and also the small force exerted by the flow of return fluid on the valve element 42, the outer sides of the partition walls 26 are provided with bellows-like structures 48 that open towards a respective pump end-wall 24. These bellows-like structures sealingly abut respective end-walls around the inlet 40 in the proximity of the end positions of the partition walls 26 and press used drive fluid through the conduit 41 connected to said inlet, so as to generate a valve-resetting pressure in that inlet port 12, 13 that is not at the moment in use, i.e. the port 13 in the state of the pump shown in FIG. 3.

Figure 4:
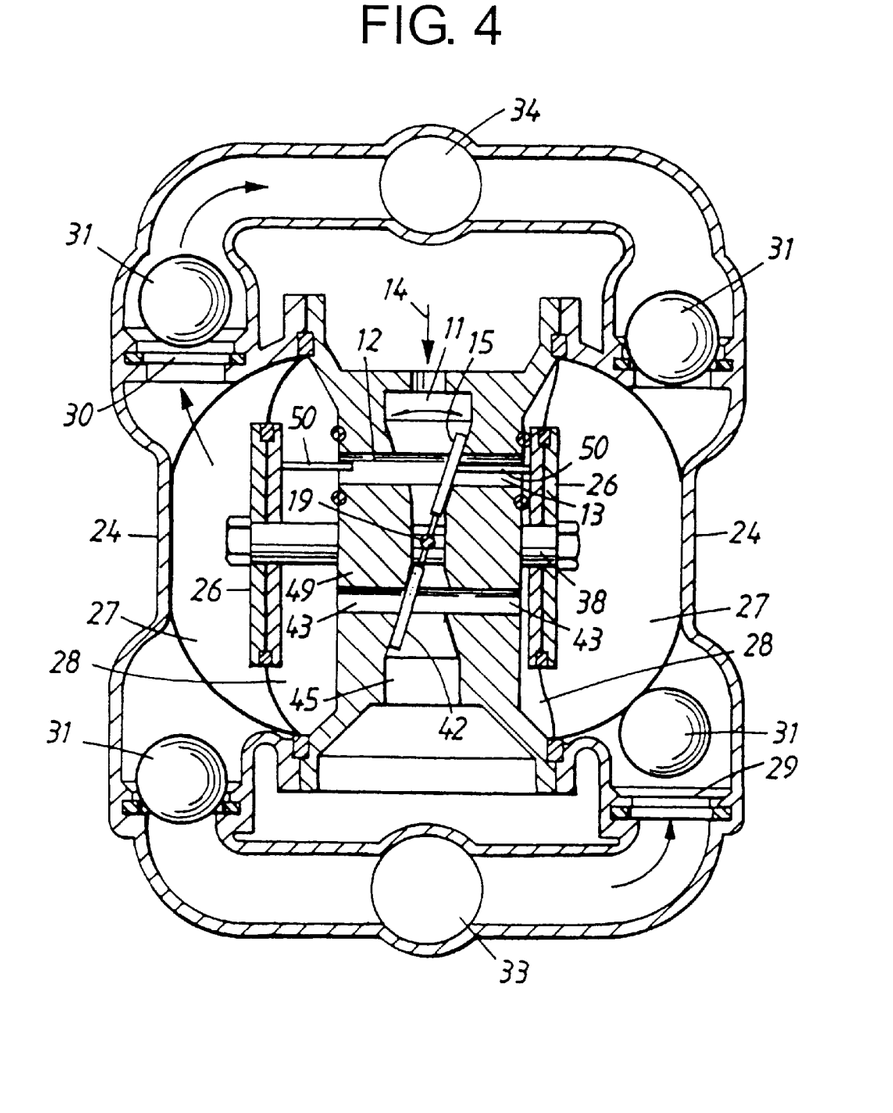
FIG. 4 is a sectional view similar to FIG. 2 which shows a differently designed double-acting pump whose pump housing accommodates an inventive valve arrangement that includes a further modified resetting means.

In the arrangement illustrated in FIG. 4, the double-acting pump is of the kind where the working chambers 27 are located proximal to the end-walls 24 of the pump housing and where the flow of medium through said chambers is controlled by ball valves 31. The operating chambers 28 are thus located close to one another on opposite sides of a central pump-housing part 49 which includes a valve arrangement of the construction shown in FIG. 3. Resetting of the valve element 15, and therewith also of the valve element 42, however, is initiated mechanically. The mutu- ally facing sides of the central parts 36 of the partition walls 26 are provided to this end with pins 50 which extend axially into a respective outlet port 12, 13. The length of the pins is adapted so that when the partition walls 26 occupy their inner positions, the pins 50 will press the valve element 15 slightly away from the position in which one of the mutually opposite surfaces 16 of said valve element closes an outlet port, either port 12 or port 13, so as to thereafter reset the valve element is under the influence of the fluid flow through the valve arrangement, and therewith close the other outlet port.

Figure 5:
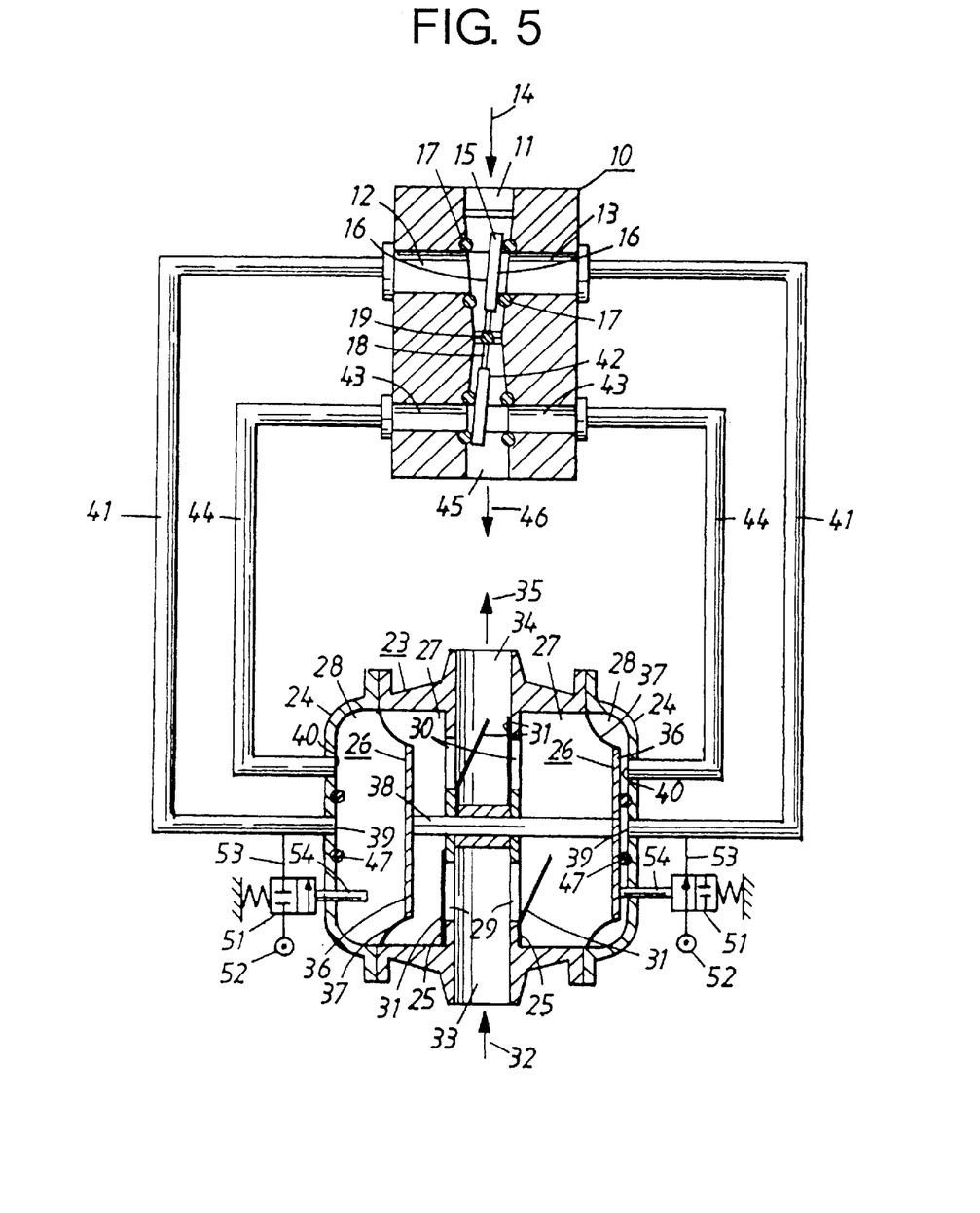
FIG. 5 is a sectional view similar to FIG. 2 and shows yet another modified version of the resetting means.

The arrangement illustrated in FIG. 5 coincides with the arrangement illustrated in FIG. 2 except in the following respects: The bleed passageways 21 of the FIG. 2 arrangement have been replaced in the FIG. 5 arrangement with a balancing valve system that includes two valves 51. The valves 51 are connected to a pressurised fluid network 52, suitably the same network as that which delivers drive fluid to the inlet port 11. Each of the valves can be connected to a respective drive-fluid conduit 41, and therewith to a respective port 12, 13, via conduits 53. The valves 51 are two-position valves which are spring biased towards a normal mode or state in which the connection between the network 52 and the conduits 53 is broken, but which can be set against the action of said spring force to an active mode or state in which connection between network 52 and conduit 53 is established. To enable resetting or switching of the valves to be achieved, each of the valves includes a respective pin 54. Each of the pins 54 projects into its respective chamber 28 and, as it engages a partition wall 26 approaching its outer end position, switches the valve concerned to its active state. In FIG. 5, the left valve 54 is in its normal state, or rest mode, in which connection between the network 52 and the conduit 53 is broken, whereas the right valve 51 has been switched to its active state or mode as a result of the partition wall 36 acting on the pin 54, wherewith the outlet port 13 is connected to the compressed air network 52 via the right valve 51 and the conduits 53 and 41. There is then generated briefly in port 13 an overpressure which causes resetting of the valve element 15, therewith causing the partition walls 26 to move to the left in FIG. 5 and enabling the valve 51 to return to its rest mode.

Figure 6:
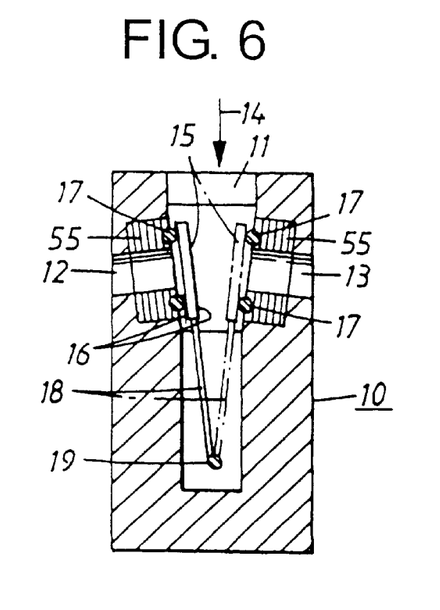
FIG. 6 is a sectional view similar to FIG. 1 showing a modified resetting means.

FIG. 6 shows a further arrangement for initiating resetting of the valve. More specifically, the valve element 15 is comprised entirely or partially of magnetic material and, for instance, electromagnets 55 are mounted at or in the outlet ports 12, 13 so as to enable the valve element 15 to be moved electromagnetically a small distance from a position in which it closes one of the outlet ports 12, 13 and thereafter be swung to a position in which it closes the other outlet port in response to pressure differences occurring on opposite sides of said valve element.

It will be understood that the invention is not restricted to the aforedescribed and illustrated exemplifying embodiments thereof and that modifications can be made within the scope of the inventive concept as defined in the Claims. For instance the conduits 53 of the embodiment illustrated in FIG. 5 may open into associated operating chambers 28. Similarly, the pins 54 may be attached to associated partition walls 26 and mounted for axial movement in the nearby pump end-wall, for resetting the valves 51 in the outer end positions of respective partition walls 26. The movement transferring device 38 connected to the partition walls 26 may be sprung in the direction of its longitudinal axis, for instance in the manner shown in WO 96/34201, wherewith the operating chambers 28 may also be placed under pressure simultaneously for short periods of time, so as to avoid pulsations in the pumped working medium. The build-up of pressure in the port 12 or the port 13 may be controlled with the aid of throttle check valves in the conduits 41.

It will be understood that for reasons of clarity, the valve arrangement illustrated in FIGS. 2–5 has been greatly enlarged in relation to the double-acting pump. However, the valve arrangement may be constructed for all manner of gas or liquid flows i.e. from very small to very large fluid flows, and the term liquid shall be understood to also include fluid/solids dispersions and slurries.

The foregoing is considered as illustrative only of the principles of the invention. Further, since numerous modifications and changes will readily occur to those skilled in theart, it is not desired to limit the invention to the exact construction and operation shown and described, and, accordingly, all suitable modifications and equivalents may be resorted to, falling within the scope of the invention.

What is claimed is:

1. A valve arrangement comprising a valve housing that includes an inlet port and two outlet ports for fluid passing through the housing, a valve element accommodated in the valve housing and moveable freely between two end positions, wherein said valve element includes two surfaces each adapted for co-action with a respective outlet port to close an associated outlet port in one and the other of said two end positions of said valve element, resetting means for resetting the valve element between said positions, a double-action pump for co-ordinating with said valve arrangement and said pump including two spaces with valve-controlled inlets and outlets for drive fluid and pump transported working fluid respectively, each said space is divided into an operating chamber and a working chamber by a respective partition wall which is reciprocatingly moveable between end positions, said partition walls are interconnected by a movement transmission means and perform alternating working strokes under the influence of said drive fluid, during which working strokes working fluid is pressed from one of the working chambers and drawn into the other of said working chambers, and vice versa, and each of the operating chamber inlets is connected to said respective outlet port of said valve arrangement, and said pump includes pump resetting means which causes the valve element to move along only a part of the movement path to the opposite end position, and said each operating chamber is connected to an associated outlet port of the valve arrangement via a conduit which is adapted to be closed by the associated partition wall when said wall is located in one of its end positions; and in that a fluid bleed passageway extends between the outlet ports and the inlet port common to said outlet ports.

2. The valve arrangement according to claim 1, wherein said resetting means exerts temporarily on the valve element a mechanical or electromagnetic force that exceeds the force exerted by the fluid pressure on the valve element in the opposite direction.

3. The valve arrangement according to claim 1, wherein said each of the bleed passageways is comprised of a bore or channel that extends through the material of the valve housing or through associated valve element.

4. The valve arrangement according to claim 3, wherein said partition walls include bellow-like structures which are open to said conduits and which function to generate an over pressure in an associated conduit when closing said conduit.

5. The valve arrangement according to claim 1, wherein said valve element is mounted on one end of a freely pivotal arm and has the form of a valve plate which includes mutually opposite surfaces for alternate co-action with a respective outlet port.

6. The valve arrangement according to claim 3, wherein said pivotal arm carries on a second end a further valve plate that has mutually opposite valve-element surfaces for co-action with a respective valve port in a further valve space.

7. The valve arrangement according to claim 1, wherein said operating chamber outlets are connected to the fluid inlets of the further valve element.

8. The valve arrangement according to claim 1, wherein said valve element is mounted on one end of a freely pivotal arm and has the form of a valve disc which includes mutually opposite surfaces for alternate co-action with a respective outlet port.

9. The valve arrangement according to claim 8, wherein said pivotal arm carries on a second end a further valve disc that has mutually opposite valve-element surfaces for co-action with a respective valve port in a further valve space.

10. A valve arrangement comprising a valve housing that includes an inlet port and two outlet ports for fluid passing through the housing, a valve element accommodated in the valve housing and moveable freely between two end positions, wherein said valve element includes two surfaces each adapted for co-action with a respective outlet port to close an associated outlet port in one and the other of said two end positions of said valve element, resetting means for resetting the valve element between said positions, a double-action pump for co-ordinating with said valve arrangement and said pump including two spaces with valve-controlled inlets and outlets for drive fluid and pump transported working fluid respectively, each said space is divided into an operating chamber and a working chamber by a respective partition wall which is reciprocatingly moveable between end positions, said partition walls are interconnected by a movement transmission means and perform alternating working strokes under the influence of said drive fluid, during which working strokes working fluid is pressed from one of the working chambers and drawn into the other of said working chambers, and vice versa, and each of the operating chamber inlets is connected to said respective outlet port of said valve arrangement, and said pump includes pump resetting means which causes the valve element to move along only a part of the movement path to the opposite end position, said operating chambers are located close together on both sides of the valve arrangement, and in that the partition walls are provided with pins which each extend into a respective outlet port and, when the partition walls are in their inner end positions, act on an associated valve-element surface to initiate resetting the valve element.

11. The valve arrangement according to claim 10, wherein said resetting means exerts temporarily on the valve element a mechanical or electromagnetic force that exceeds the force exerted by the fluid pressure on the valve element in the opposite direction.

12. The valve arrangement according to claim 10, wherein said each of the bleed passageways is comprised of a bore or channel that extends through the material of the valve housing or through associated valve element.

13. The valve arrangement according to claim 10, wherein said partition walls include bellow-like structures which are open to said conduits and which function to generate an over pressure in an associated conduit when closing said conduit.

14. The valve arrangement according to claim 10, wherein said valve element is mounted on one end of a freely pivotal arm and has the form of a valve plate which includes mutually opposite surfaces for alternate co-action with a respective outlet port.

15. The valve arrangement according to claim 14, wherein said pivotal arm carries on a second end a further valve plate that has mutually opposite valve-element surfaces for co-action with a respective valve port in a further valve space.

16. The valve arrangement according to claim 10, wherein said valve element is mounted on one end of a freely pivotal arm and has the form of a valve disc which includes mutually opposite surfaces for alternate co-action with a respective outlet port.

17. The valve arrangement according to claim 16, wherein said pivotal arm carries on a second end a further valve disc that has mutually opposite valve-element surfaces for co-action with a respective valve port in a further valve space.

18. A valve arrangement comprising a valve housing that includes an inlet port and two outlet ports for fluid passing through the housing, a valve element accommodated in the valve housing and moveable freely between two positions, wherein said valve element includes two surfaces each adapted for co-action with a respective outlet port to close an associated outlet port in one and the other of said two end positions of said valve element, resetting means for resetting the valve element between said positions, a double-action pump for co-ordinating with said valve arrangement and said pump including two spaces with valve-controlled inlets and outlets for drive fluid and pump transported working fluid respectively, each said space is divided into an operating chamber and a working chamber by a respective partition wall which is reciprocatingly moveable between end positions, said partition walls are interconnected by a movement transmission means and perform alternating working strokes under the influence of said drive fluid, during which working strokes working fluid is pressed from one of the working chambers and drawn into the other of said working chambers, and vice versa, and each of the operating chamber inlets is connected to said respective outlet port of said valve arrangement, and said pump includes pump resetting means which causes the valve element to move along only a part of the movement path to the opposite end position, said valve element is connected mechanically to and adapted to drive a further valve element between two positions in which it connects either one or the other of two fluid inlet ports to a fluid outlet port which is common to said two inlet ports.

19. The valve arrangement according to claim 18, wherein said resetting means exerts temporarily on the valve element a mechanical or electromagnetic force that exceeds the force exerted by the fluid pressure on the valve element in the opposite direction.

20. The valve arrangement according to claim 18, wherein said each of the bleed passageways is comprised of a bore or channel that extends through the material of the valve housing or through associated valve element.

21. The valve arrangement according to claim 18, wherein said partition walls include bellow-like structures which are open to said conduits and which function to generate an over pressure in an associated conduit when closing said conduit.

22. The valve arrangement according to claim 18, wherein said valve element is mounted on one end of a freely pivotal arm and has the form of a valve plate which includes mutually opposite surfaces for alternate co-action with a respective outlet port.

23. The valve arrangement according to claim 22, wherein said pivotal arm carries on a second end a further valve plate that has mutually opposite valve-element surfaces for co-action with a respective valve port in a further valve space.

24. The valve arrangement according to claim 18, wherein said valve element is mounted on one end of a freely pivotal arm and has the form of a valve disc which includes mutually opposite surfaces for alternate co-action with a respective outlet port.

25. The valve arrangement according to claim 24, wherein said pivotal arm carries on a second end a further valve disc that has mutually opposite valve-element surfaces for co-action with a respective valve port in a further valve space.

* * * * *